(12) United States Patent
Shimizu

(10) Patent No.: US 10,847,318 B2
(45) Date of Patent: Nov. 24, 2020

(54) METHOD OF MANUFACTURING CERAMIC ELECTRONIC COMPONENT

(71) Applicant: Murata Manufacturing Co., Ltd., Nagaokakyo (JP)

(72) Inventor: Kotaro Shimizu, Nagaokakyo (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 235 days.

(21) Appl. No.: 15/253,979

(22) Filed: Sep. 1, 2016

(65) Prior Publication Data
US 2017/0069428 A1 Mar. 9, 2017

(30) Foreign Application Priority Data
Sep. 3, 2015 (JP) .................... 2015-173824

(51) Int. Cl.
*H01G 7/00* (2006.01)
*H01G 4/30* (2006.01)
*H01G 4/232* (2006.01)

(52) U.S. Cl.
CPC .............. *H01G 4/30* (2013.01); *H01G 4/232* (2013.01); *H01G 4/2325* (2013.01); *Y10T 29/435* (2015.01)

(58) Field of Classification Search
CPC ............ H01G 4/30; H01G 4/12; H01G 4/005; H01G 4/228; H01G 4/2325; H01G 4/232; C08F 214/182; C08F 2/06; H01L 2924/19041; Y10T 29/43; Y10T 29/435; Y10T 29/417
USPC ..... 361/306, 321.2, 311; 336/233; 29/25.03, 29/25.42, 846, 412, 830, 831, 842; 427/5
See application file for complete search history.

(56) References Cited

U.S. PATENT DOCUMENTS

| | | | |
|---|---|---|---|
| 9,336,952 B2 * | 5/2016 | Chung | H01G 4/30 |
| 2006/0171099 A1 * | 8/2006 | Barber | B32B 18/00 |
| | | | 361/321.2 |
| 2014/0254064 A1 | 9/2014 | Miyazaki | |
| 2014/0302325 A1 * | 10/2014 | Shimada | C09C 3/12 |
| | | | 428/405 |
| 2016/0099106 A1 | 4/2016 | Kurokawa et al. | |

FOREIGN PATENT DOCUMENTS

| | | |
|---|---|---|
| JP | 07-10751 B2 | 2/1995 |
| JP | 2970030 B2 | 11/1999 |
| JP | 2013-165178 A | 8/2013 |
| JP | 2014-197666 A | 10/2014 |
| JP | 2015-053495 A | 3/2015 |
| KR | 10-2012-0083725 A | 7/2012 |

OTHER PUBLICATIONS

Official Communication issued in corresponding Korean Patent Application No. 10-2016-0110545, dated Aug. 16, 2017.
Official Communication issued in Chinese Patent Application No. 201610773244.2, dated Aug. 29, 2018.
Official Communication issued in Japanese Patent Application No. 2015-173824, dated Mar. 26, 2019.

* cited by examiner

*Primary Examiner* — Thiem D Phan
(74) *Attorney, Agent, or Firm* — Keating & Bennett, LLP

(57) ABSTRACT

A method of manufacturing a ceramic electronic component includes adding a modifier to a surface of chip containing ceramics and an organic material, applying a conductive paste on the surface of the chip to which the modifier has been added, and firing the chip along with the conductive paste applied on the chip.

18 Claims, 6 Drawing Sheets

LH CROSS-SECTIONAL VIEW

LH CROSS-SECTIONAL VIEW

METHOD OF MANUFACTURING CERAMIC ELECTRONIC COMPONENT

CROSS REFERENCE TO RELATED APPLICATIONS

This application claims the benefit of priority to Japanese Patent Application 2015-173824 filed Sep. 3, 2015. The entire contents of this application are hereby incorporated by reference herein.

BACKGROUND OF THE INVENTION

1. Field of the Invention

The present invention relates to a method of manufacturing a ceramic electronic component.

2. Description of the Related Art

An electronic component including a main body and at least two outer electrodes provided on a surface of the main body is manufactured by applying a conductive paste, which will define the outer electrodes, to the main body. When the conductive paste that will define the outer electrodes is applied to the main body, the conductive paste spreads across part of the surface of the main body. Edge areas of the conductive paste that have spread across part of the surface of the main body are rounded due to the effects of surface tension, viscosity, and other factors. Edge areas of the outer electrodes obtained as a result are thus rounded as well. It has, therefore, been difficult to ensure that a gap is present between the two outer electrodes while also ensuring that the outer electrodes have sufficiently large surface areas.

Japanese Unexamined Patent Application Publication No. 2014-197666 discloses a method of modifying the surface of a main body (surface modification) before applying a conductive paste to the main body in order to reduce the affinity between the surface of the main body and a solvent present in the conductive paste. Using this method makes it possible to reduce spreading of the conductive paste across the surface of the main body and reduce rounding of the edge areas of the outer electrodes.

According to Japanese Unexamined Patent Application Publication No. 2014-197666, the main body of a multilayer ceramic capacitor is subjected to the surface modification. In Japanese Unexamined Patent Application Publication No. 2014-197666, the "main body" subjected to surface modification is a ceramic material fired at a high temperature, and thus, the surface subjected to surface modification is a fired ceramic surface.

However, the material used for the surface modification in Japanese Unexamined Patent Application Publication No. 2014-197666 does not have a very high affinity to ceramics. As such, according to the method disclosed in Japanese Unexamined Patent Application Publication No. 2014-197666, a surface modification process performed over a short amount of time will not achieve a very good surface modification effect. What is needed, therefore, is another method that can suppress rounding in the edge area of an outer electrode.

SUMMARY OF THE INVENTION

Preferred embodiments of the present invention provide a method of manufacturing a ceramic electronic component, in which the electronic component includes a ceramic main body and an outer electrode provided on a surface of the ceramic main body, that is particularly capable of significantly reducing or preventing rounding in an edge area of the outer electrode.

According to a preferred embodiment of the present invention, a method of manufacturing a ceramic electronic component includes adding a modifier to a surface of a chip containing ceramics and an organic material, applying a conductive paste on the surface of the chip to which the modifier has been added, and firing the chip along with the conductive paste applied on the chip.

In a method of manufacturing a ceramic electronic component according to a preferred embodiment of the present invention, in the step of adding the modifier, the chip is immersed in a solution containing the modifier.

In a method of manufacturing a ceramic electronic component according to a preferred embodiment of the present invention, in the step of adding the modifier, the modifier is caused to chemically adsorb to the organic material contained in the chip by a radical reaction.

In a method of manufacturing a ceramic electronic component according to a preferred embodiment of the present invention, the modifier is a silicon compound. In a method of manufacturing a ceramic electronic component according to another preferred embodiment of the present invention, the modifier is a fluorine compound.

In a method of manufacturing a ceramic electronic component according to a preferred embodiment of the present invention, the chip is a rectangular or substantially rectangular parallelepiped including a main surface and an end surface that intersects with the main surface and is perpendicular or substantially perpendicular to a length direction, the chip includes an inner electrode layer that is embedded in the chip and is exposed on the end surface, and the step of applying the conductive paste applies the conductive paste on the end surface of the chip and a portion of the main surface of the chip, such that a length direction dimension of the conductive paste on the main surface is greater than a height direction dimension of the chip.

In a method of manufacturing a ceramic electronic component according to a preferred embodiment of the present invention, a modifier is added to a chip containing an organic material. The modifier adsorbs to the organic material more easily than to ceramics, which is an inorganic material, and thus adding the modifier to the surface of the chip containing ceramics and an organic material makes it possible to modify the surface of the chip with greater certainty. Rounding in edge areas of the outer electrodes obtained is significantly reduced or prevented as a result.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

A method of manufacturing a ceramic electronic component according to a preferred embodiment of the present invention will be described hereinafter with reference to the drawings. However, the present invention is not intended to be limited to the configurations described below, and various modifications can be applied as appropriate without departing from the spirit of the present invention. Furthermore, a combination of two or more individual preferred embodiments according to the present invention described below is also considered to be included in the scope of the present invention.

A capacitor, an inductor, a piezoelectric component, a thermistor, and other suitable components can be used as examples of ceramic electronic components that can be manufactured using the method of manufacturing a ceramic electronic component according to a preferred embodiment of the present invention. The following will describe a capacitor, and a multilayer ceramic capacitor, in particular, as an example of a ceramic electronic component that can be manufactured using the method of manufacturing a ceramic electronic component according to a preferred embodiment of the present invention.

Figure 1:
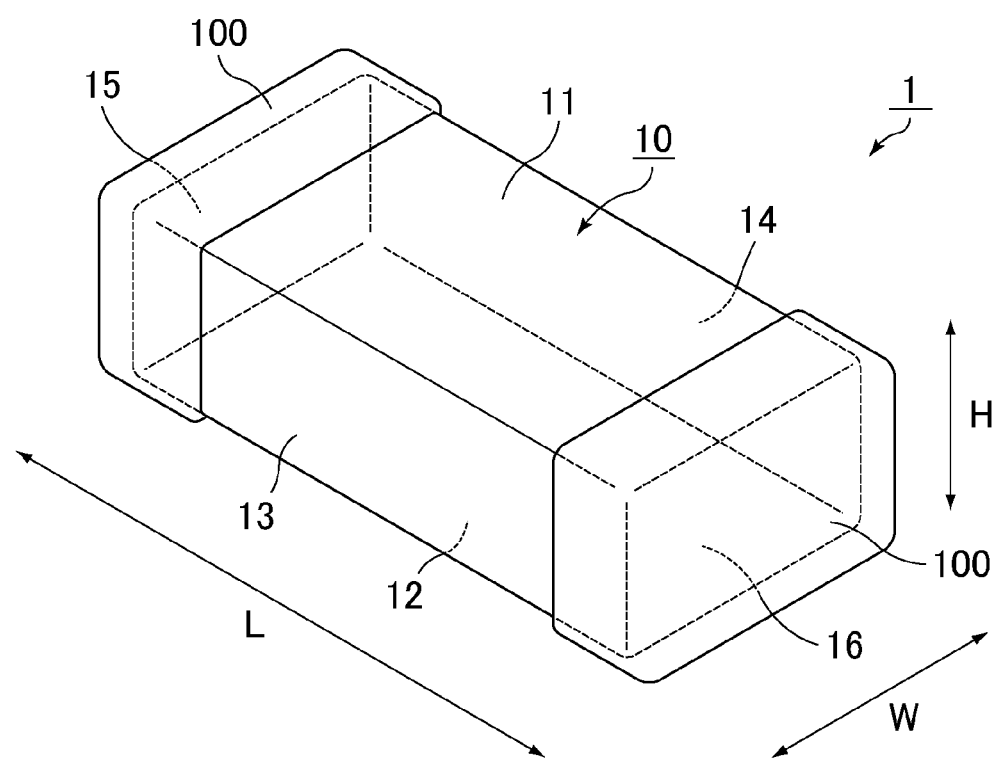
FIG. 1 is a perspective view schematically illustrating an example of a multilayer ceramic capacitor manufactured using the method of manufacturing a ceramic electronic component according to a preferred embodiment of the present invention.

The multilayer ceramic capacitor includes a rectangular or substantially rectangular parallelepiped main body and a plurality of outer electrodes provided on portions of a surface of the main body. FIG. 1 is a perspective view schematically illustrating an example of the multilayer ceramic capacitor manufactured using the method of manufacturing a ceramic electronic component according to a preferred embodiment of the present invention. In a multilayer ceramic capacitor 1, outer electrodes 100 are provided on portions of a surface of a main body 10.

Figure 2:
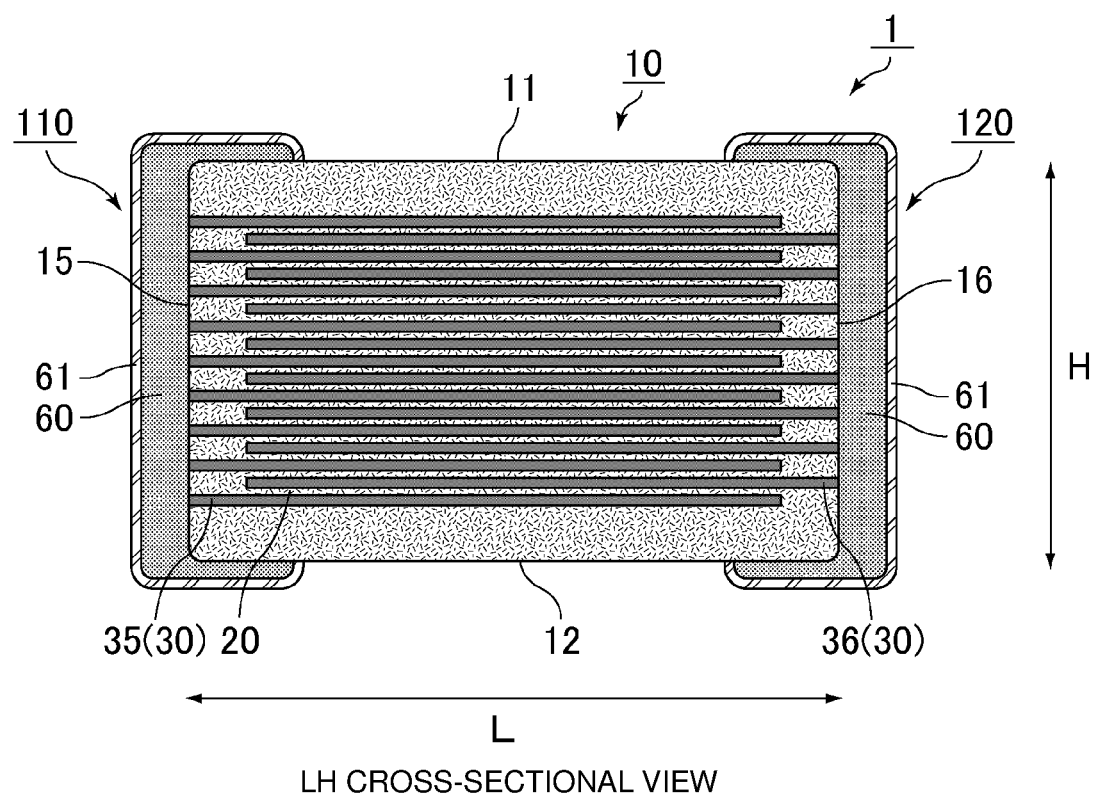
FIG. 2 is an LH cross-sectional view of the multilayer ceramic capacitor illustrated in FIG. 1.

FIG. 2 is an LH cross-sectional view of the multilayer ceramic capacitor illustrated in FIG. 1.

The main body of the ceramic electronic component according to a preferred embodiment of the present invention is preferably a rectangular or substantially rectangular parallelepiped, and a length direction, a width direction, and a height direction thereof correspond to directions defined by double-ended arrows L, W, and H, respectively, indicated for the multilayer ceramic capacitor 1 in FIG. 1. The length direction, the width direction, and the height direction are perpendicular or substantially perpendicular to each other. The height direction corresponds to a direction in which a plurality of ceramic layers 20 and a plurality of inner conductor layers 30 of the main body 10 are stacked. The length direction, corresponds to a direction in which the outer electrodes face each other when the outer electrodes are provided on both ends of the main body (that is, a direction in which a plurality of different outer electrodes are present).

The main body 10 is preferably a six-sided rectangular or substantially rectangular parallelepiped including a first main surface 11 and a second main surface 12 that are opposed to each other in the height direction, a first side surface 13 and a second side surface 14 that are opposed to each other in the width direction, and a first end surface 15 and a second end surface 16 that are opposed to each other in the length direction. Note that the rectangular or substantially rectangular parallelepiped shape of the main body includes shapes in which corner portions, ridge line portions, and other portions thereof are rounded, as well as shapes in which non-planarities are included in one or more surfaces thereof.

A cross-section of the ceramic electronic component (the multilayer ceramic capacitor) or the main body that intersects with the first end surface 15 or the second end surface 16 of the multilayer ceramic capacitor 1 or the main body 10, and that is taken along the height direction, is referred to as an "LH cross-section". FIG. 2 is an LH cross-sectional view of the multilayer ceramic capacitor illustrated in FIG. 1.

The first side surface 13, the second side surface 14, the first end surface 15, and the second end surface 16 are surfaces on which the inner conductor layers 30 may be exposed. Any of these surfaces on which the inner conductor layers 30 are exposed is defined as a "surface of the main body" and the outer electrode 100 can be provided on a portion of that surface.

The main body 10 includes a plurality of ceramic layers 20 and a plurality of inner conductor layers 30 that are stacked. The plurality of inner conductor layers 30 include a plurality of first inner electrode layers 35 exposed at least on the first end surface 15 of the main body 10 and connected to a first outer electrode 110 provided on the first end surface 15, and a plurality of second inner electrode layers 36 exposed at least on the second end surface 16 of the main body 10 and connected to a second outer electrode 120 provided on the second end surface 16. Such a configuration makes it possible to achieve good properties as a multilayer ceramic capacitor.

Preferably, the average thickness of each ceramic layer 20 is no less than approximately 0.5 μm and no greater than approximately 4 μm, for example. Each ceramic layer preferably contains a ceramic material including barium titanate ($BaTiO_3$), calcium titanate ($CaTiO_3$), strontium titanate ($SrTiO_3$), calcium zirconate ($CaZrO_3$), or other suitable ceramic material, for example, as a primary component. Additionally, each ceramic layer 20 may preferably contain Mn, Mg, Si, Co, Ni, a rare earth, or other suitable material, for example, as a secondary component having a lower content than the primary component.

The plurality of inner conductor layers 30 includes the first inner electrode layers 35 and the second inner electrode layers 36 arranged in an alternating manner in the height direction. Each first inner electrode layer 35 preferably includes an opposing portion that opposes the second inner electrode layers 36 with the ceramic layers 20 interposed therebetween, and an extended portion that extends to the first end surface 15 from the opposing portion and is exposed on the first end surface 15. Each second inner electrode layer 36 preferably includes an opposing portion that opposes the opposing portions of the first inner electrode layers 35 with the ceramic layers 20 interposed therebetween, and an extended portion that extends to the second end surface 16 from the opposing portion and is exposed on the second end surface 16. An electrostatic capacitance is generated by the first inner electrode layers 35, the second inner electrode layers 36, and the ceramic layers 20 interposed therebetween. Note that in addition to the first inner electrode layers 35 and the second inner electrode layers 36, the plurality of inner conductor layers 30 may preferably include inner conductor layers that do not substantially contribute to the generation of the electrostatic capacitance. Each inner conductor layer 30 is preferably rectangular or substantially rectangular when viewed in plan view from the height direction. Preferably, the average thickness of each inner conductor layer 30 is no less than approximately 0.2 μm and no greater than approximately 2 μm, for example. The plurality of inner conductor layers 30 preferably contain a metal material such as Ni, Cu, Ag, Pd, an Ag—Pd alloy, Au, or other suitable metal material, for example.

The average thicknesses of the plurality of inner conductor layers 30 and the plurality of ceramic layers 20 are measured as follows. First, a cross-section perpendicular or substantially perpendicular to the length direction of the main body, exposed through grinding, is viewed under a scanning electron microscope. Next, thicknesses are measured along a total of five lines, namely a centerline along the height direction that passes through a center of the cross-section of the main body and two lines at equal intervals drawn on both sides of the centerline. The average thickness is an average of these five measured values. To find a more accurate average thickness, the stated five measured values are found at each of an upper area, a center area, and a lower area in the height direction, and the average of these measured values is used as the average thickness.

When a height direction dimension of the main body 10 is represented by DH, a length direction dimension by DL, and a width direction dimension by DW, it is preferable that the main body 10 have a low-profile whose dimensions meet the conditions of DH<DW<DL, (1/7)DW≤DH (1/3)DW, or DH<approximately 0.25 mm, for example. The effects of preferred embodiments of the present invention are more effectively achieved with a ceramic electronic component having such dimensions for the main body. Specifically, the effects of preferred embodiments of the present invention are even more effectively achieved when approximately 0.05 mm DH≤approximately 0.25 mm, approximately 0.4 mm≤DL≤approximately 1 mm, and approximately 0.3 mm≤DW≤approximately 0.5 mm, for example. It is also preferable that the length DL of the main body in the length direction be greater than the dimension DW of the main body in the width direction.

Additionally, it is preferable that dimensions of the outer electrodes in the length direction when viewed from the height direction be greater than the dimension DW of the main body in the width direction. This enables the fixing strength with which the ceramic electronic component is mounted on a mounting board to be increased, even if the ceramic electronic component is thin. Alternatively, this facilitates providing via connections to the ceramic electronic component if the ceramic electronic component is embedded in a board.

FIG. 2 illustrates both the first outer electrode 110 and the second outer electrode 120 provided on the surface of the main body 10. A preferred configuration of these outer electrodes will be described below. The first outer electrode 110 is provided on the first end surface 15 of the main body 10, extends from the first end surface 15 across portions of the first main surface 11, the second main surface 12, the first side surface 13, and the second side surface 14, and covers those surfaces. The first outer electrode 110 is connected to the first inner electrode layers 35 at the first end surface 15. The second outer electrode 120 is provided on the second end surface 16 of the main body 10, extends from the second end surface 16 across portions of the first main surface 11, the second main surface 12, the first side surface 13, and the second side surface 14, and covers those surfaces. The second outer electrode 120 is connected to the second inner electrode layers 36 at the second end surface 16.

Preferably, the first outer electrode 110 and the second outer electrode 120 having the structure illustrated in FIG. 2 each includes a base layer 60 containing glass and Ni, and a Cu plating layer 61 directly covering the base layer 60, for example. The Cu plating layer 61 is the outermost layer of the first outer electrode 110 and the second outer electrode 120. Preferably, a BaO—SrO—$B_2O_3$—$SiO_2$-based glass frit is used as the glass in the base layer 60. Preferably, the average thickness of the Cu plating layer 61 is no less than approximately 1 μm and no greater than approximately 15 μm, for example. Meanwhile, a plating layer containing at least one type of metal selected from Ni, Sn, Pd, Au, Ag, Pt, Bi, Zn, and other suitable metal, for example, may be used as the plating layer.

Note that a plurality of plating layers may be provided. For example, the plating layer may preferably include a first Cu plating layer and a second Cu plating layer directly covering the first Cu plating layer. In this case, it is preferable that an average particle diameter of Cu particles in the second Cu plating layer be smaller than an average particle diameter of Cu particles in the first Cu plating layer. As the plurality of plating layers, a Cu plating layer, a Ni plating player, and a Sn plating layer may preferably be provided in that order from the base layer toward the outside, instead of the first Cu plating layer and the second Cu plating layer. In this case, the Sn plating layer is the outermost layer of each outer electrode. The outer electrodes 100 may include another outer electrode separate from the first outer electrode 110 and the second outer electrode 120 between the first outer electrode 110 and the second outer electrode 120. Additionally, the base layer 60 may contain Cu, for example, instead of Ni.

Figure 3:
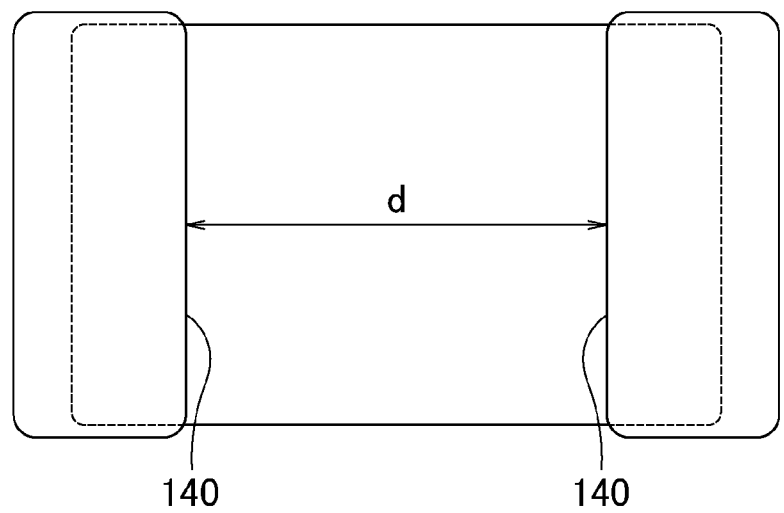
FIG. 3 is a top view of the multilayer ceramic capacitor illustrated in FIG. 1.

A ceramic electronic component manufactured using a method of manufacturing a ceramic electronic component according to a preferred embodiment of the present invention effectively reduces or prevents rounding in edge areas of the outer electrodes, and thus, the outer electrodes have a shape such as that shown in FIG. 3, for example. FIG. 3 is a top view of the multilayer ceramic capacitor illustrated in FIG. 1.

In the multilayer ceramic capacitor 1, edge areas 140 of the outer electrodes 100 are not rounded, and instead define a straight or substantially straight line overall. Preferably, the edge areas of the outer electrodes are not rounded, and instead form a straight or substantially straight line overall at portions in which the main body is present immediately therebelow (in other words, in all portions of the width direction of the main body). Such a shape ensures that a gap is present between the two outer electrodes (a distance indicated by a double-ended arrow d in FIG. 3), and ensures a sufficient surface area for the outer electrodes without that surface area becoming too small.

Figure 4:
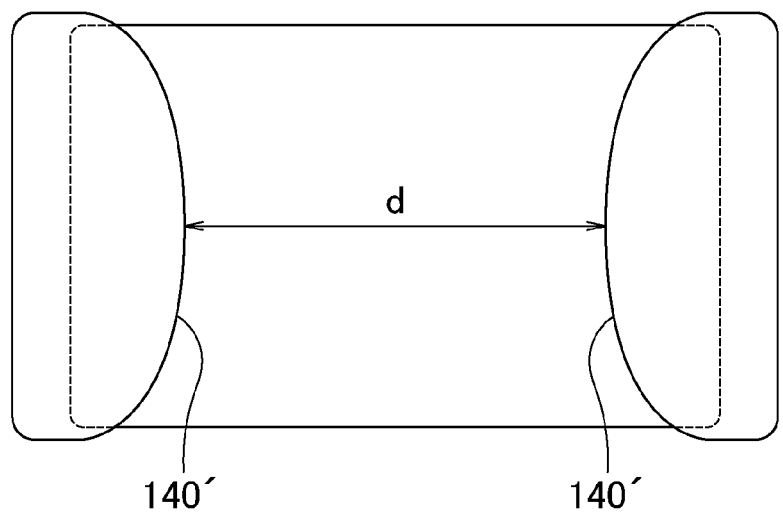
FIG. 4 is a top view schematically illustrating an example of a multilayer ceramic capacitor in which edge areas of outer electrodes are rounded.

FIG. 4 is a top view schematically illustrating an example of a multilayer ceramic capacitor in which the edge areas of the outer electrodes are rounded. When the edge areas of the outer electrodes are rounded as indicated in FIG. 4, the surface area of the outer electrodes will decrease if an attempt is made to ensure that a gap having the same or approximately the same amount of distance as that indicated by the double-ended arrow d in FIG. 3 is present between the two outer electrodes. The edge areas of the outer electrode are indicated by reference numeral 140' in FIG. 4, and the edge areas 140' of the outer electrodes are rounded rather than straight or substantially straight.

A ceramic electronic component manufactured using a method of manufacturing a ceramic electronic component according to a preferred embodiment of the present invention can be used as an electronic component embedded in a board or as an electronic component mounted on the surface of a board. In the case of an electronic component mounted on the surface of a board, the surface of the outer electrodes is preferably a Sn plating layer, for example. Providing the above-described features effectively reduces or prevents shape variations in the outer electrodes and tombstoning, even when the electronic component is mounted on the surface of a board.

A method of manufacturing a multilayer ceramic capacitor will be described next as an example of a method of manufacturing a ceramic electronic component according to a preferred embodiment of the present invention. A ceramic sheet is obtained by applying a ceramic slurry, in which ceramics, an organic material, a carrier, and other ingredients are mixed together, in sheet is formed on a carrier film through a printing technique, spray coating, die coating, or other suitable process, for example. The ceramic sheet contains the ceramics, the organic material, and a residual carrier. A conductive film that will define the inner conductor layer is formed upon the ceramic sheet through screen printing, gravure printing, or other suitable process. A plurality of ceramic sheets in which the conductive film has been formed are stacked to form a stacked sheet. A polyvinyl butyral-based binder, a phthalate ester-based binder, and other suitable binders, are examples of the organic material contained in the ceramic sheet.

The stacked sheets are pressurized using a rigid body press, an isostatic press, or other suitable device to form a laminated block. The laminated block is then divided into a plurality of chips through push-cutting, cutting with a dicing machine, or other suitable process. Note that as long as the chips contain ceramics and organic material, another method may be used instead.

Preferably, the chips obtained in this manner are rectangular or substantially rectangular parallelepiped units, with main surfaces and end surfaces that intersect with the main surfaces and are perpendicular or substantially perpendicular to the length direction, and include inner electrode layers that are embedded in the chips and are exposed on the end surfaces. A chip that has a similar shape as that of the main body of the multilayer ceramic capacitor illustrated in FIG. 1 is one specific example.

Next, a process of adding a modifier to the surface of the chip is performed. It is sufficient for the surfaces on which the modifier is added to be the surfaces of the portions where the conductive paste will later be applied, but the modifier may be added to the entire surface of the chip including those portions. It is preferable that the process of adding the modifier to the surface of the chip be performed by immersing the chip in a solution containing the modifier, or by chemical adsorption of the modifier to the organic material contained in the chip through a radical reaction, for example. Each of these methods will be described below.

Figure 5:
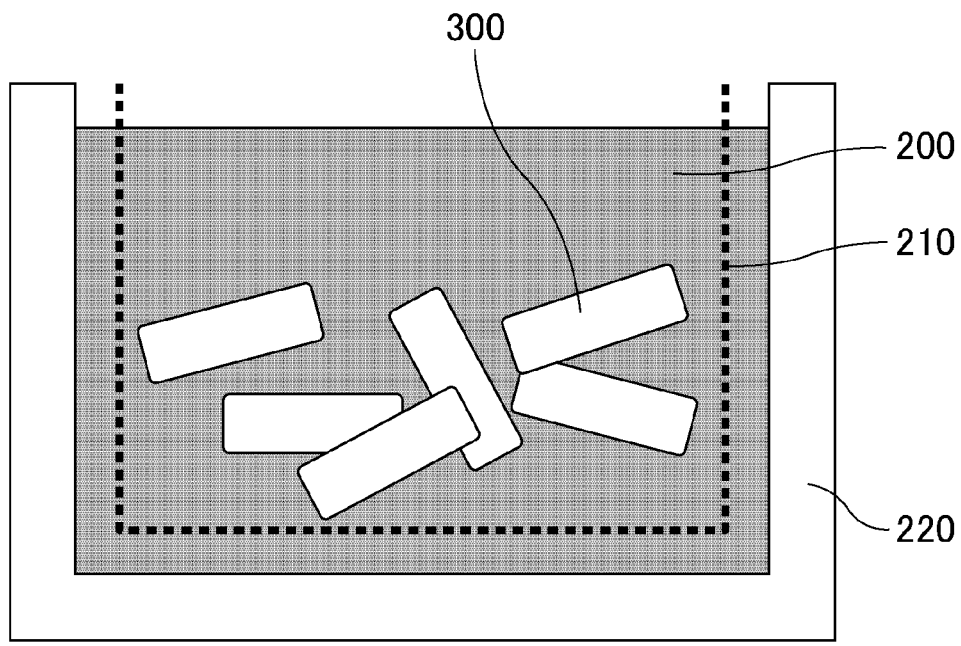
FIG. 5 is a schematic diagram illustrating an example of a method according to a preferred embodiment of the present invention of immersing chips in a solution containing a modifier.

FIG. 5 is a schematic diagram illustrating an example of a method of immersing the chips in a solution containing a modifier according to a preferred embodiment of the present invention. A tank 220 is filled with a solution 200 containing the modifier, the tank 220 is provided with a net basket (made from a net through which the chips cannot pass) 210, and chips 300 are placed in the net basket 210 and immersed in the solution containing the modifier. The modifier is added to the entire surfaces of the chips 300 by the method illustrated in FIG. 5.

Preferably, the solution containing the modifier contains a fluorine compound or a silicon compound, for example. As the fluorine compound, a compound containing carbon and fluorine is more preferable, and a fluorocarbon such as $CF_4$, $C_2F_6$, $C_3F_8$, or other suitable compound, for example, is further preferable. A hydrofluorocarbon obtained by bonding hydrogen may also be used. $SiO$, $SiH_4$, $Si(CH_3)_4$, or other suitable compound, for example, is preferable as the silicon compound. Additionally, a fluorine compound and a silicon compound may be used in combination, and two or more types of fluorine compounds and two or more types of silicon compounds may also be used in combination. An organic solvent (isopropyl alcohol, ethanol, or other suitable solution, for example) is preferable as the carrier that defines the solution. Preferably, the concentration of the modifier within the solution is no less than approximately 1 wt % and no more than approximately 5 wt %, for example. Additionally, it is preferable that the time of immersion in the modifier solution be no less than approximately three minutes and no more than approximately 10 minutes, for example. After immersing the chips in the solution containing the modifier, the chip surfaces may be brought into contact with the solution more thoroughly by agitating or shaking the solution, for example.

After the chips have been immersed in the solution containing the modifier, it is preferable that the chips be removed from the solution, blow-dried or dried in a drying machine, and the carrier in the solution adhering thereto removed therefrom. Although a drying temperature can be set as desired in accordance with the type of the carrier, the drying temperature is preferably no less than approximately 50° C. and no more than approximately 200° C., for example. The method of adding the modifier to the surfaces of the chips by immersing the chips in the solution containing the modifier is preferable in that no special device is required to be used in order to add the modifier to the surfaces of the chips.

When using a method that causes the modifier to chemically adsorb to the organic material contained in the chip through a radical reaction according to a preferred embodiment of the present invention, it is preferable to use a radical reaction employing plasma, for example. When a plasma process is used on the modifier and the chip containing the organic material, the surface of the organic material reacts under the radical reaction and gas of the modifier also reacts, and these chemically adsorb to the organic material. In a process using plasma, the gas of the modifier is injected under low pressure, and electrons are caused to collide with the gas molecules by applying a high-frequency voltage to the gas at this time. Monomers derived from the gas are generated and these monomers are added to the surface of the chip. When performing the plasma process, it is preferable that a plasma power be set to no less than approximately 30 W and no more than approximately 250 W, a gas flow rate be set to no less than approximately 10 sccm and no more than approximately 250 sccm, and a processing time be set to no less than approximately 10 seconds and no more than approximately 10 minutes, for example.

Even if a ceramic material that does not contain an organic material, such as the main body obtained by firing the chip, is subjected to plasma processing, chemical adsorption will not occur, and instead, the monomers will simply undergo physical adsorption. It is easier for fluorine compounds or silicon compounds to remain with chemical adsorption than with physical adsorption, and thus, the surface of the chip is able to be modified more reliably. The modification can also be performed in a short amount of time. It is, therefore, preferable to use a method that causes the modifier to chemically adsorb to the organic material contained in the chip through a radical reaction.

Preferably, the gas used as the modifier is a fluorine compound or a silicon compound. As the fluorine compound, a compound containing carbon and fluorine is more preferable, and a fluorocarbon such as $CF_4$, $C_2F_6$, $C_3F_8$, or other suitable compound, for example, is further preferable. A hydrofluorocarbon obtained by bonding hydrogen may also be used. SiO, $SiH_4$, $Si(CH_3)_4$, or other suitable compound, for example, is preferable as the silicon compound. A fluorine compound and a silicon compound may be used in combination, and two or more types of fluorine compounds and two or more types of silicon compounds may be used in combination as well.

Preferably, the surface modification results in the surface of the chip to which the modifier has been added having an angle of contact of no less than approximately 100° and no more than approximately 200° with respect to pure water, for example. It is also preferable that the angle of contact with respect to an organic solvent (terpineol) be no less than approximately 30° and no more than approximately 100°, for example. A chip whose surface has not been modified normally has an angle of contact of no less than approximately 50° and no more than approximately 100° with respect to pure water. The angle of contact with respect to an organic solvent (terpineol) is also normally no less than approximately 5° and no more than approximately 30°.

Note that almost all of the modifier that has been adsorbed to the surface of the chip is removed as a result of volatization when the chip is fired, and thus, the modifier does not affect the mounting reliability of the resulting ceramic electronic component.

Figure 6:
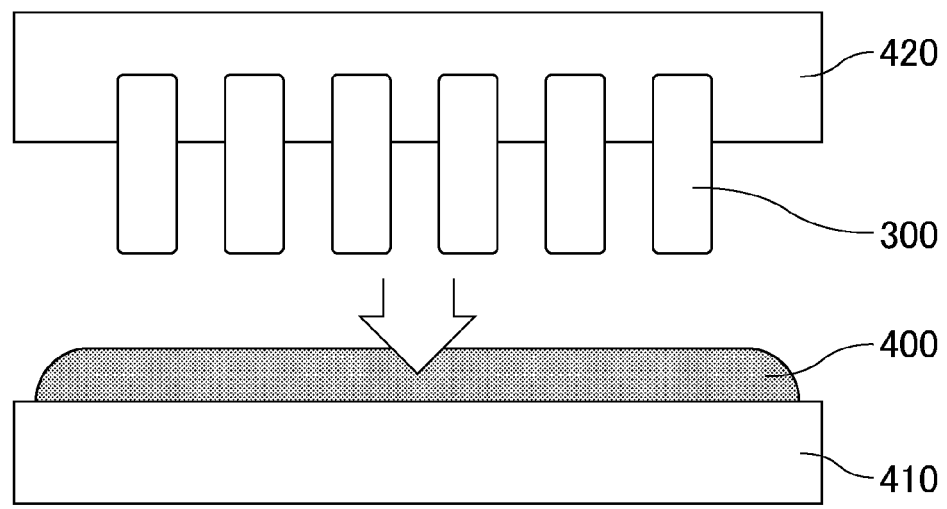
FIG. 6 is a schematic diagram illustrating an example of a process according to a preferred embodiment of the present invention of applying a conductive paste to chips using a dipping method.

Next, a conductive paste is applied to the surface of the chip to which the modifier has been added. The conductive paste is a paste used for the outer electrodes, and can be applied using a dipping method, for example. FIG. 6 is a schematic diagram illustrating an example of the process of applying the conductive paste to chips using the dipping method according to a preferred embodiment of the present invention.

In the process illustrated in FIG. 6, a conductive paste 400 is applied to a base 410, and the chips 300 are held with their orientations aligned by a holding plate 420. The chips 300 are brought into contact with the conductive paste 400 by bringing the holding plate 420 toward the base 410. As a result, the conductive paste 400 is applied to predetermined locations of the chips 300. When the chips 300 are held by the holding plate 420, the orientations of the chips are aligned such that end surfaces of the chips 300 make contact with the conductive paste 400.

In the process of applying the conductive paste, it is preferable that the conductive paste be applied from the end surfaces of the chips across a portion of the main surfaces of the chips such that the dimension of the outer electrodes on the main surfaces in the length direction is greater than the dimension of the chip in the height direction. In other words, it is preferable that the depth to which the chips are immersed in the conductive paste be adjusted such that the dimension of the outer electrodes on the main surfaces in the length direction is greater than the dimension of the chip in the height direction. The method of manufacturing a ceramic electronic component according to a preferred embodiment of the present invention significantly reduces or prevents rounding of the edge areas of the outer electrode, and thus, ensures a sufficient surface area of the outer electrodes on the main surfaces and also ensures a sufficient distance between the outer electrodes.

The surfaces of the chips 300 that make contact with the conductive paste 400 are surfaces to which the modifier has been added. This reduces or prevents spreading of the conductive paste on the surfaces of the chips 300.

Preferably, a paste obtained by adding a metal powder and ceramics to an organic carrier can be used as the conductive paste. An ethocel resin (ethyl cellulose), a butyral resin, an organic solvent (terpineol, dihydro terpineol), or other suitable substance, for example, can be used as the organic carrier. Preferably, Cu powder or Ni powder, for example, is used as the metal powder. Additionally, glass can be used as the ceramics, and preferably, a $BaO$—$SrO$—$B_2O_3$—$SiO_2$-based glass frit, for example, is used as the glass.

The following is an example of a preferred ratio of the organic carrier, metal powder, and ceramics in the conductive paste: no less than approximately 30 wt % and no more than approximately 50 wt % for the organic carrier, no less than approximately 30 wt % and no more than approximately 50 wt % for the metal powder, and no less than approximately 10 wt % and no more than approximately 30 wt % for the ceramics. Additionally, it is preferable that the viscosity of the conductive paste (a viscosity measured at 1 rpm using an E-type viscometer, at a measurement temperature of 25° C.) be no less than approximately 10 Pa·s and no more than approximately 80 Pa·s, for example.

The conductive paste is preferably applied to both end surfaces of each chip by performing the same process on both end surfaces of each chip.

When the chip to which the conductive paste has been applied is fired, the chip defines the main body of the ceramic electronic component, and the conductive paste defines the base layers corresponding to portions of the outer electrodes. This firing also results in the conductive films formed in the chip turning into the inner conductor layers and the ceramic sheets turning into the ceramic layers. The organic material present in the chip is volatized, carbonized, or eliminated by the firing.

The outer electrodes are then preferably formed by forming the plating layer on the base layer through a plating process. Accordingly, a multilayer ceramic capacitor as an example of a ceramic electronic component can be manufactured through these processes.

Working examples that more specifically disclose the multilayer ceramic capacitor as an example of a ceramic electronic component according to a preferred embodiment of the present invention will be described below. Note, however, that the present invention is not intended to be limited to these working examples.

Working Example 1

1) Creating Laminated Block

A ceramic slurry was created by adding a polyvinyl butyral-based binder, a plasticizer, and ethanol used as an organic solvent to $BaTiO_3$ used as a ceramic raw material and then wet-blending these components using a ball mill. The ceramic slurry was then formed into a sheet through a lip method, producing a rectangular or substantially rectangular ceramic sheet. Next, a conductive paste containing Ni was screen-printed onto the ceramic sheet, thus forming a conductive film, having Ni as a primary component, to serve as the inner conductor layer. A plurality of the ceramic sheets on which the conductive film was formed were then stacked so that the sides to which the conductive film extend alternated, and stacked sheets were obtained. These stacked sheets were then pressure-molded and divided using a dicing machine to obtain chips. The dimensions of the chips obtained were approximately 1.2 mm in the length direction (DL), approximately 0.7 mm in the width direction (DW), and approximately 0.3 mm in the height direction (DH).

2) Adding Modifier

A fluorine compound was added to the chip surfaces as the modifier.

3) Application of Conductive Paste

A paste having the following composition was prepared as the conductive paste. The viscosity of the conductive paste (a viscosity measured at 1 rpm using an E-type viscometer, at a measurement temperature of 25° C.) was approximately 30 Pa·s.

Organic carrier: a combination of ethocel resin and a terpineol-based organic solvent at 40 wt %
Metal powder: Ni at 40 wt %
Common material: ceramics at 20 wt %

This conductive paste was then applied to the surfaces of the chips using a dipping method.

4) Chip Firing

The chip to which the conductive paste was applied was then heated in a $N_2$ atmosphere and the binder was combusted; the chip was then fired in a reducing atmosphere containing $H_2$, $N_2$, and $H_2O$ gas, and the main body to which the conductive paste was applied and that was fired was obtained as a result.

Comparative Example 1

Conductive paste was applied to the chip without carrying out the process of 2) Adding Modifier in Working Example 1, after which the chip was fired to obtain the main body to which the conductive paste was applied and that was fired.

Comparative Example 2

The main body was obtained by firing the chip without carrying out the processes of 2) Adding Modifier and 3) Application of Conductive Paste in Working Example 1. Thereafter, the modifier was added to the surface of the fired main body in the same manner as in the process of 2) Adding Modifier, and then the conductive paste was applied to the surface of the main body in the same manner as in the process of 3) Application of Conductive Paste. The chip was then fired again under the same conditions as in 4) Chip Firing, and the main body to which the conductive paste was applied and that was fired was obtained.

In Working Example 1, the edge areas of the outer electrode were straight rather than being rounded. However, in Comparative Example 1, the edge areas of the outer electrode were rounded. In Comparative Example 2, the shapes of the edge areas of the outer electrodes varied. It is believed that the surface of the chip was not sufficiently modified in Comparative Example 2. In other words, using the method of Working Example 1, in which a modifier is added to a chip containing an organic material, makes it possible to modify the surface of the chip with greater certainty. Rounding in the edge areas of the obtained outer electrodes is significantly reduced or prevented as a result.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A method of manufacturing a ceramic electronic component, the method comprising:
   adding a modifier to a surface of a chip containing ceramics and an organic material;
   applying a conductive paste on the surface of the chip to which the modifier has been added; and
   firing the chip along with the conductive paste applied on the chip; wherein
   in the step of adding the modifier, the modifier is added to the surface of the chip before any firing of the chip and before any conductive paste is applied on the surface of the chip.

2. The method of manufacturing a ceramic electronic component according to claim 1, wherein in the step of adding the modifier, the chip is immersed in a solution containing the modifier.

3. The method of manufacturing a ceramic electronic component according to claim 2, wherein the solution containing the modifier contains at least one of a fluorine compound or a silicon compound.

4. The method of manufacturing a ceramic electronic component according to claim 2, wherein the solution containing to modifier contains a fluorocarbon.

5. The method of manufacturing a ceramic electronic component according to claim 4, wherein the fluorocarbon is one of $CF_4$, $C_2F_6$, and $C_3F_8$.

6. The method of manufacturing a ceramic electronic component according to claim 2, wherein the solution containing to modifier contains one of $SiO$, $SiH_4$, and $Si(CH_3)_4$.

7. The method of manufacturing a ceramic electronic component according to claim 2, wherein the solution containing to modifier further contains an organic solvent.

8. The method of manufacturing a ceramic electronic component according to claim 7, wherein the organic solvent is one of isopropyl alcohol and ethanol.

9. The method of manufacturing a ceramic electronic component according to claim 2, wherein the concentration of the modifier contained in the solution is no less than approximately 1 wt % and no more than approximately 5 wt %.

10. The method of manufacturing a ceramic electronic component according to claim 2, wherein the chip is immersed in the solution for no less than approximately three minutes and no more than approximately 10 minutes.

11. The method of manufacturing a ceramic electronic component according to claim 1, wherein in the step of adding the modifier, the modifier is caused to chemically adsorb to the organic material contained in the chip by a radical reaction.

12. The method of manufacturing a ceramic electronic component according to claim 11, wherein the radical reaction is performed using a plasma process.

13. The method of manufacturing a ceramic electronic component according to claim 12, wherein in the plasma process, a plasma power of the plasma process in set to no less than approximately 30 W and no more than approximately 250 W.

14. The method of manufacturing a ceramic electronic component according to claim 12, wherein in the plasma process, a gas flow rate is set to no less than approximately 10 sccm and no more than approximately 250 sccm.

15. The method of manufacturing a ceramic electronic component according to claim 12, wherein in the plasma process, a processing time is set to no less than approximately 10 seconds and no more than approximately 10 minutes.

16. The method of manufacturing a ceramic electronic component according to claim 1, wherein the modifier is a silicon compound.

17. The method of manufacturing a ceramic electronic component according to claim 1, wherein the modifier is a fluorine compound.

18. The method of manufacturing a ceramic electronic component according to claim 1, wherein
   the chip is a rectangular or substantially rectangular parallelepiped including a main surface and an end surface that intersects with the main surface and is perpendicular or substantially perpendicular to a length direction;
   the chip includes an inner electrode layer that is embedded in the chip and is exposed on the end surface; and
   in the step of applying the conductive paste, the conductive paste is applied on the end surface of the chip and a portion of the main surface of the chip such that a length direction dimension of the conductive paste on the main surface is greater than a height direction dimension of the chip.

* * * * *